United States Patent Office 3,522,198
Patented July 28, 1970

3,522,198
MODIFIED POLYPROPYLENE COMPOSITION
Nobuo Yamada, Akira Ichikawa, and Munehiro Okumura, Ohtake-shi, Haruo Miyamoto, Nagoya, and Toshiyuki Nanbu, Ohtake-shi, Japan, assignors to Mitsubishi Rayon Co., Ltd., Tokyo, Japan, a corporation of Japan
Continuation-in-part of application Ser. No. 405,994, Oct. 23, 1964. This application Oct. 25, 1968, Ser. No. 770,623
Claims priority, application Japan, Oct. 22, 1963, 38/56,803; Dec. 25, 1963, 38/70,285; Sept. 10, 1964, 39/51,692
Int. Cl. C08c 11/70; C08f 45/52
U.S. Cl. 260—28.5
4 Claims

ABSTRACT OF THE DISCLOSURE

Polypropylene composition with an abrasive resistance, comprising polypropylene having an isotactic index of not less than 95%, and a molecular weight in terms of an intrinsic viscosity of 1.0 to 3.0 determined in Tetralin at 135° C., and 1 to 20% by weight, on the basis polypropylene, of a mixture consisting essentially of (A) paraffin wax, microcrystalline wax, or low molecular weight polyethylene as paraffin, each having a mean molecular weight of 500 to 3,000 and (B) 5 to 20% by weight, on the basis of paraffin, of polyethylene.

---

Figure 1:
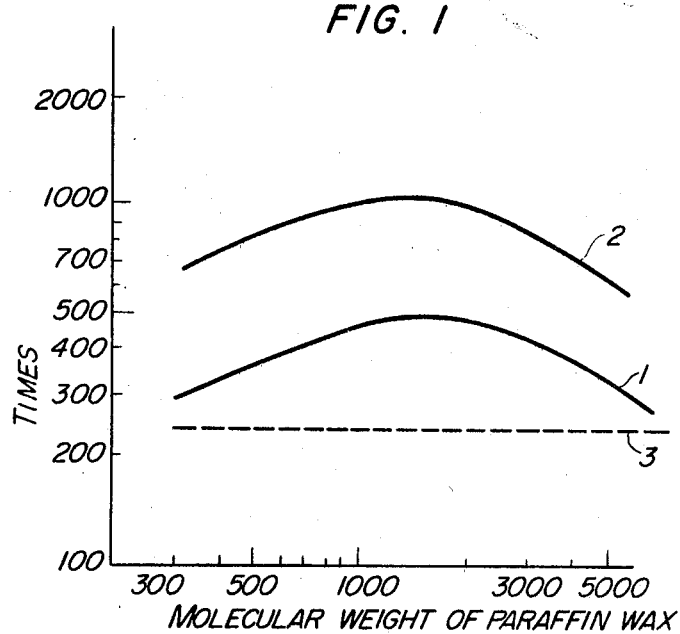

This application is a continuation-in-part of application U.S. Ser. No. 405,994 filed on Oct. 23, 1964, now abandoned.

This invention relates to modified polypropylene composition. More particularly this invention relates to polypropylene structures which are prepared from polypropylene composition having high abrasion resistance or both high abrasion resistance and improved dyeability.

Polypropylene structures particularly fibers or tapes have originally various superior properties such as tensile strength, flexual resistance and the like. On the other hand, they have substantial drawbacks in the usefulness as fiber products, because of poor abrasion resistance and dyeability due to lack of dye site in their chemical constitution. Particularly insufficient abrasion resistance has been hampering to be used as industrial raw materials.

As regards improvement of dyeability of polypropylene structures, various methods have been proposed. For example, a method which is characterized by mixing a high molecular weight or a low molecular weight compound including dye site with polypropylene spinning or extruding and afterwards subjecting spinning or extruding, another method which is characterized by treating polypropylene fibers chemically to provide it with dye site, and some other attempts were made. However, there have been no particular methods proposed for the improvement of abrasion resistance.

In general, as an industrial raw material, structures particularly fibers or tapes must possess uniform tenacious property and nylon is commonly used in this field as it has property. In spite of various much superior mechanical properties compared with other synthetic fibers or tapes, the usefulness of polypropylene fibers or tapes is extremely limited, owing to the drawbacks of poor abrasion resistance and dyeability. Accordingly if the drawbacks of such as abrasion and dyeability are improved, it is believed that the usefulness of polypropylene fibers or tapes as industrial raw materials must be also developed. Once we, the inventors of this invention, discovered that the abrasion resistance of polypropylene fibers or tapes can be improved by blending with some polyethylene or polyethylene derivatives, and yet this method brought about the reduction of other mechanical properties. Accordingly we made a further research to develop the method above for preparing polypropylene fibers or tapes having high abrasion resistance without degrading the original superior mechanical properties of polypropylene fibers or tapes, and polypropylene fibers or tapes having improved the both drawbacks of abrasion resistance and dyeability.

The main object of the present invention is to prepare polypropylene structures having high abrasion resistance by spinning or extruding the polypropylene composition, which have been incorporated the mixture of specified paraffine and polyethylene prior to spinning or extruding. This mixture should be conveniently called abrasion resistant hereafter. Another object of the present invention is to provide polypropylene structures which are simultaneously improved both in abrasion resistance and dyeability.

These objects can be attained by the present invention. According to the present invention, the abrasion resistance of polypropylene structures can be improved by incorporating a mixture of specified paraffine and polyethylene to polypropylene before spinning or extruding and subjecting the resulting polypropylene composition with abrasion resistance to spinning or extruding. Further by selecting the relation of the amount of added abrasion resistant, molecular weight of fibers and denier of monofilament suitably, the improvement of fibers can be made most sufficiently to the respective use for apparels or industrial raw material. The stabilization of knot can be attained by coating with various kinds of specified resin. The dyeability can be simultaneously improved by incorporating with at least one kind of copolymer of radically polymerizable pyridine compound, a metal-salt, or anion exchange substance.

Polypropylene composition useful for preparing polypropylene fibers or tapes with abrasion resistance is comprised by polypropylene with 1 to 20% of an abrasion resistant based upon the weight of polypropylene. The abrasion resistant consists mainly of a mixture of specified paraffine having a mean molecular weight of 500 to 3,000 (A) and 5 to 20% of polyethylene (B) based upon the weight of paraffine.

In order to improve dyeability simultaneously with abrasion resistance, polypropylene is incorporated with, beside abrasion resistant, such a dyeability modifier as e.g. at least one kind of copolymer, one component of which is radically polymerizable pyridine compound, a mixture of such substance with or without dyeing assistant; or a metal salt or anion exchange substance wtih or without dyeing assistant.

Polypropylene used in the present invention is not necessarily of perfectly isotactic form.

However, it is preferable to use polypropylene having an isotactic index of 95 or more, and a molecular weight in terms of intrinsic viscosity of 1.0 to 3.0 determined in Tetralin at 135° C. In that case, polypropylene having an isotactic index of less than 95 is not desirable, because the strength of the obtained shaped article is lowered. Further, in case of polypropylene having a molecular weight in term of intrinsic viscosity of less than 1.0, the strength of the obtained shaped article is lowered and thus the desired sufficient abrasion resistance cannot be obtained. Furthermore, when the intrinsic viscosity is over 3.0, the stretchability of the shaped article becomes worse and the strength is lowered.

The isotactic index is herein defined as a ratio of a residue obtained by extracting polypropylene powders with heptane at its boiling point to the original polypropylene sample, as expressed in percentage.

The abrasion resistant useful in the present invention is mainly a mixture of specific paraffin (A) and polyethylene (B).

In that case, the employed specific paraffin has a molecular weight of 500 to 3000 and includes microcrystalline wax derived and prepared from petroleum, synthetic wax which is deemed a kind of microcrystalline wax, low molecular weight polyethylene, paraffin wax which is solid at room temperature (30° C.) and prepared as a petroleum refinery product, etc. These specific paraffins are readily available as commercial products. For example, "AC polyethylene" having a softening point of 95° to 110° C. and a molecular weight of 1500 to 2500, a product manufactured by Allied Chemical (USA) and "Epolene" manufactured by Eastman Chemical (USA) are available as a low molecular weight polyethylene. "Paraffin Wax" having a melting point of 80° to 90° C., which is sold by Nippon Seiro Co., Ltd. (Japan), is available as a paraffin wax. Further, "Microcrystalline Wax" having a molecular weight of 580 to 850 and a melting point of 77° to 83° C., which is manufactured by Mobil Oil Company (USA), is available as a microcrystalline wax.

Figure 4:
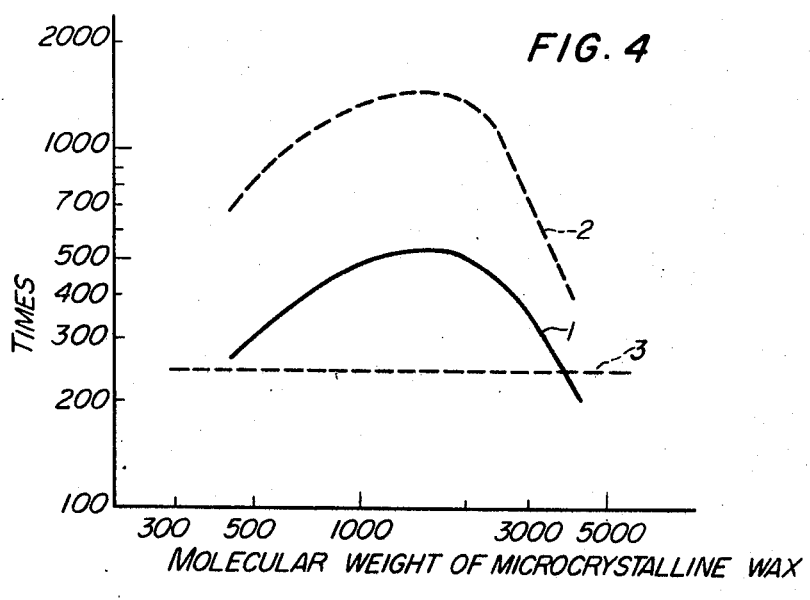
Figure 5:
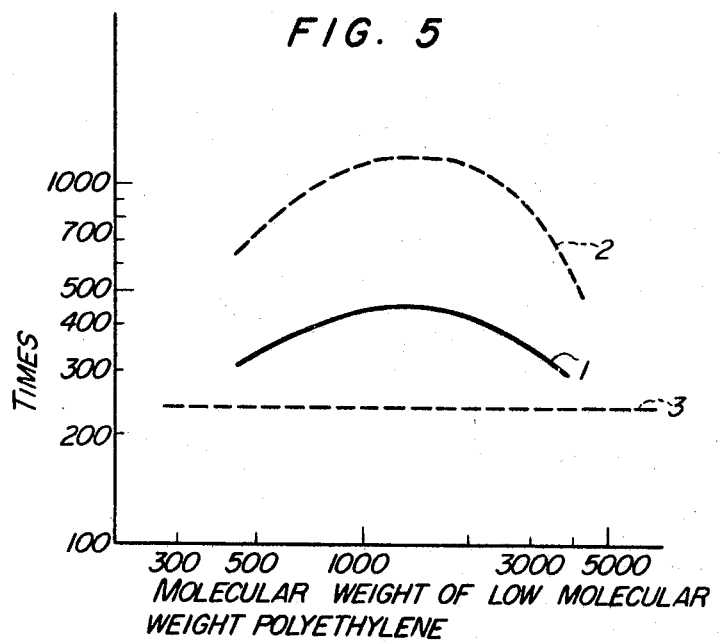

As a result of studying various paraffins, the preferable paraffins for the present invention are restricted to specific microcrystalline wax, low molecular weight polyethylene, and paraffin wax, each having a molecular weight of 500 to 3000. As shown in FIGS. 1, 4 and 5, the paraffins specified in the present invention can show an excellent effect upon increase in the abrasion resistance, an object of the present invention, when the paraffins are used in mixture with polyethylene.

FIG. 1 shows a correlation between change in molecular weight of paraffin wax and effect by addition of paraffin wax in case mixtures of 90% by weight of paraffin waxes having the respective molecular weight and 10% by weight of low pressure process polyethylene is mixed with 10% by weight of polypropylene.

In this figure, the line 1 shows the change of abrasion times (specified below) in the case when paraffin waxes having various molecular weights is admixed to polypropylene having an isotactic index of 98 and a molecular weight in term of $[\eta]$ of 1.5 in an amount of 10% by weight. The line 2 shows the change of abrasion times in the case when 10% by weight of a mixture consisting of 90% by weight of paraffin waxes having various molecular weight and 10% by weight of low pressure polyethylene, is admixed to the same polypropylene. The dotted line 3 shows the change of abrasion times in the case when low pressure polyethylene having a molecular weight of 60,000 is admixed to the same polypropylene in an amount of 10% by weight.

As is apparent from FIG. 1, when paraffin wax alone is added to polypropylene, there is observed difference of abrasion resistance depending on the molecular weight of paraffin wax.

FIGS. 4 and 5 show correlations between changes in molecular weights of microcrystalline wax and low molecular weight polyethylene and effect by use of microcrystalline wax and low molecular weight polyethylene in case 10% by weight of mixtures of 85% by weight of microcrystalline waxes of the respective molecular weights and low molecular weight polyethylene and 15% of medium pressure process polyethylene are mixed with polypropylene. In FIGS. 4 and 5, the respective lines 1 show changes of abrasion times in case 10% by weight of a mixture of microcrystalline wax and low molecular weight polyethylene is singly mixed with polypropylene having an isotactic index of 98 and a molecular weight in terms of $[\eta]$ of 1.5. The respective lines 2 show changes of abrasion times in case 10% by weight of a mixture consisting of 90% by weight of microcrystalline wax and low molecular weight polyethylene and 10% by weight of high pressure process polyethylene having a molecular weight of 10,000 is mixed with polypropylene. Further, the respective dotted lines 3 show changes of abrasion times in case 10% by weight of high pressure process polyethylene having a molecular weight of 10,000 is singly mixed with polypropylene.

From these figures, it is seen that the notably effective range of molecular weights of specific paraffins are from 500 to 3,000, preferably from 1,000 to 2,000 in the present invention. The abrasion times in the present invention are preferably more than 500, whereas in the abrasion times are less than 200 in the case of unmodified polypropylene.

When the mean molecular weight of specified paraffins (A) as mentioned above is lower than 500 or higher than 3,000, any improvement in abrasion resistance cannot be expected as shown in FIGS. 1, 4 and 5.

Figure 9:
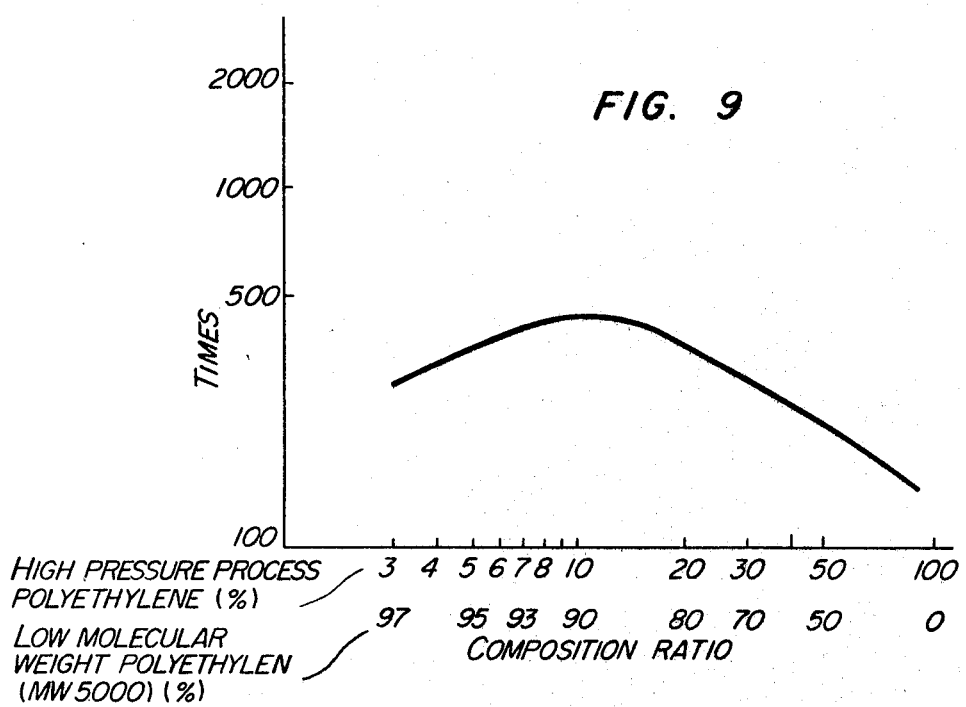
Figure 10:
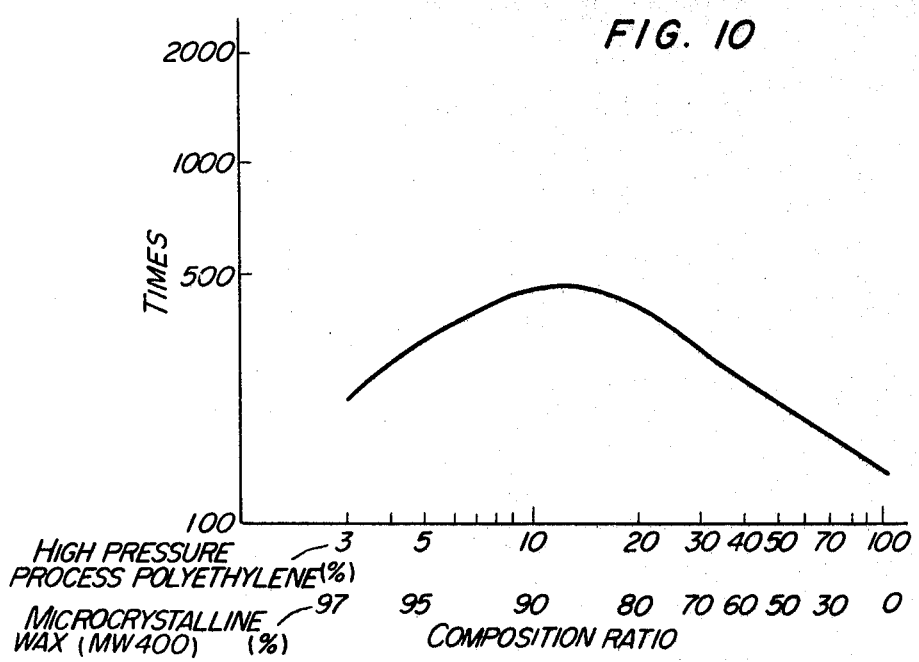

For comparison, the abrasion resistances are studied on the cases where 15% by weight of mixtures consisting of microcrystalline wax having a mean molecular weight of 400 or low molecular weight polyethylene having a mean molecular weight of 5000 and high pressure process polyethylene having a mean molecular weight of 80,000 in such proportions as shown in FIGS. 9 and 10 are individually mixed with polypropylene having an isotactic index of 99 and a molecular weight in terms of $[\eta]$ of 2.0, and the results of the study are shown in FIGS. 9 and 10.

As is obvious from FIGS. 9 and 10, no effect can be expected when the mean molecular weight of specific paraffins (A) is lower than 500 or higher than 3,000.

The specific paraffins used in the present invention are restricted to those which are solid at room temperature (30° C.), but the liquid paraffins, etc. are not desirable because the surface of a product prepared from the present composition becomes tacky and the processability becomes worse at further working. The paraffins are restricted to one of three specific kinds in the present invention, as described above, but other paraffins than these three are not desirable, in that a mutual solubility or processability to both polyethylene and polypropylene is necessary in the present invention. Polyethylene which is used together with paraffins may be of any kind, whether it is made by low pressure process, middle pressure process, or high pressure process. Its mean molecular weight is preferably to be in the range of 12,000 to 120,000.

Polyethylene is preferably to be used with specified paraffin when its mean molecular weight is in the range of 12,000 to 120,000.

The proportion of polyethylene to paraffin is from 5 to 20% by weight (vs. specified paraffin) preferably from 5 to 15% by weight (vs. specified paraffin). When the proportion of polyethylene to specified paraffin is less than 5% by weight or greater than 20% by weight, these mixtures do not afford sufficient result on the improvement of abrasion resistance of polypropylene structure even when the former is mixed to the latter. Accordingly while maintaining the above-mentioned proportion, a mixture of specified paraffin and polyethylene is admixed to polypropylene in a proportion of 1 to 20% preferably 3 to 15% based upon the weight of the latter.

Figure 2:
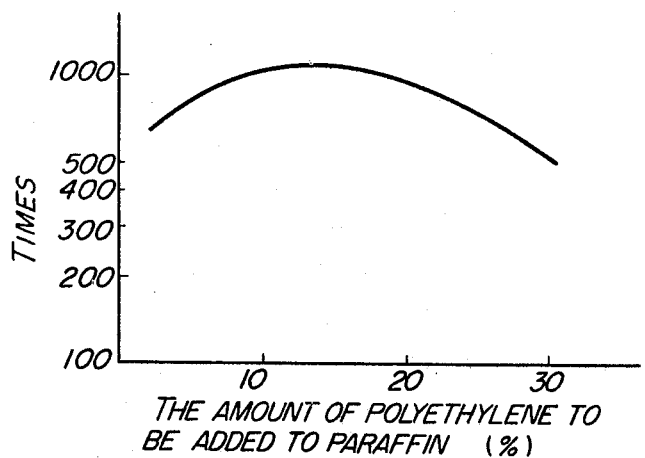

FIG. 2 is a diagram showing the change of abrasion resistance of modified polypropylene in the case when various amount of low pressure polyethylene having a mean molecular weight of 60,000 is added to paraffin wax having a mean molecular weight of 1,400.

Figure 11:
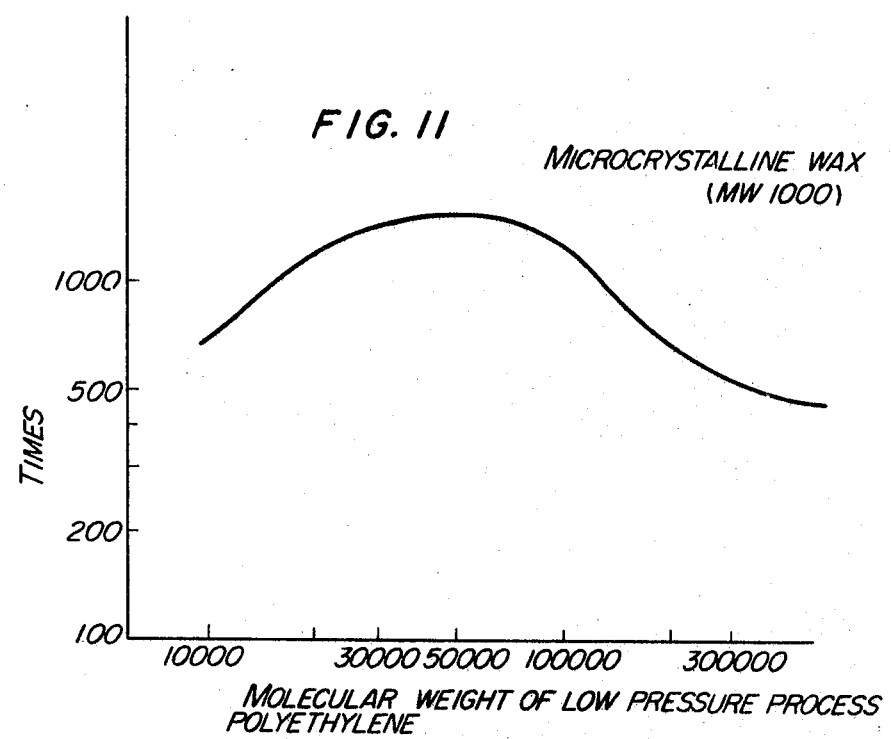
Figure 12:
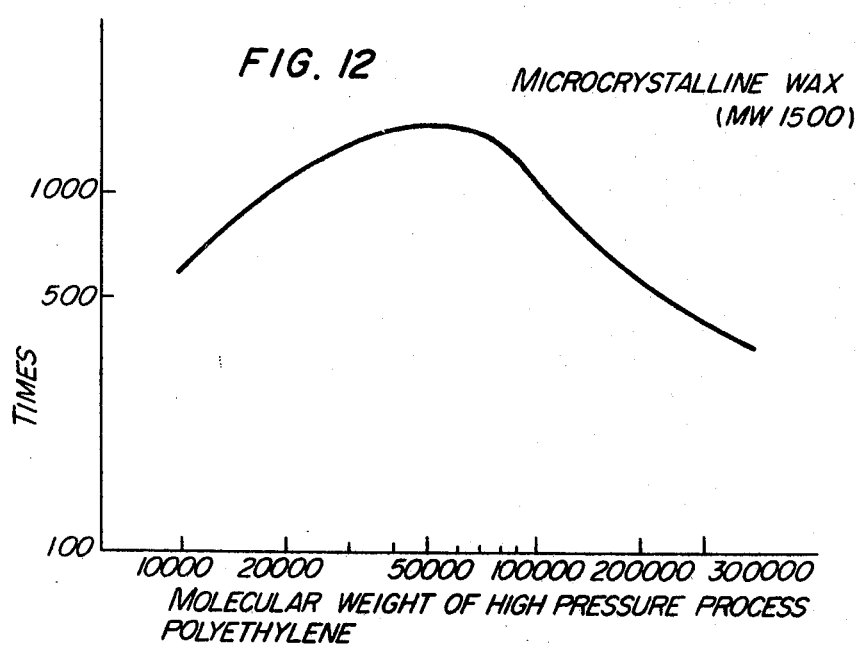

For studying an effect of a range of molecular weight of polyethylene upon the abrasion resistance, 15% by weight of low pressure process polyethylene and high pressure process polyethylene are mixed with microcrystalline wax having a mean molecular weight of 1000 and microcrystalline wax having a mean molecular weight of 1500 respectively as shown in FIGS. 11 and 12, and 10% by weight of the resulting mixtures are individually added to polypropylene having an isotactic index of 98 and molecular weight in terms of $[\eta]$ of 1.9. The abrasion resistances of the resulting compositions are studied.

As a result, it is made clear that polyethylene having a molecular weight range of about 12,000 to about 120,000 has an excellent effect upon the abrasion resistance.

If the molecular weight of polyethylene used in the present invention is lower than 12,000, the abrasion resistance is lowered, and further the tension appearing when the shaped article is stretched is lowered and the stretchability is deteriorated. As a consequence, the strength is lowered. When the molecular weight is higher than 120,000, the orientation of shaped article of polypropylene is inhibited and the strength is lowered. Further, phase separation of polypropylene and polyethylene takes place and consequently fibrilation is brought about and the abrasion resistance is lowered.

Figure 6:
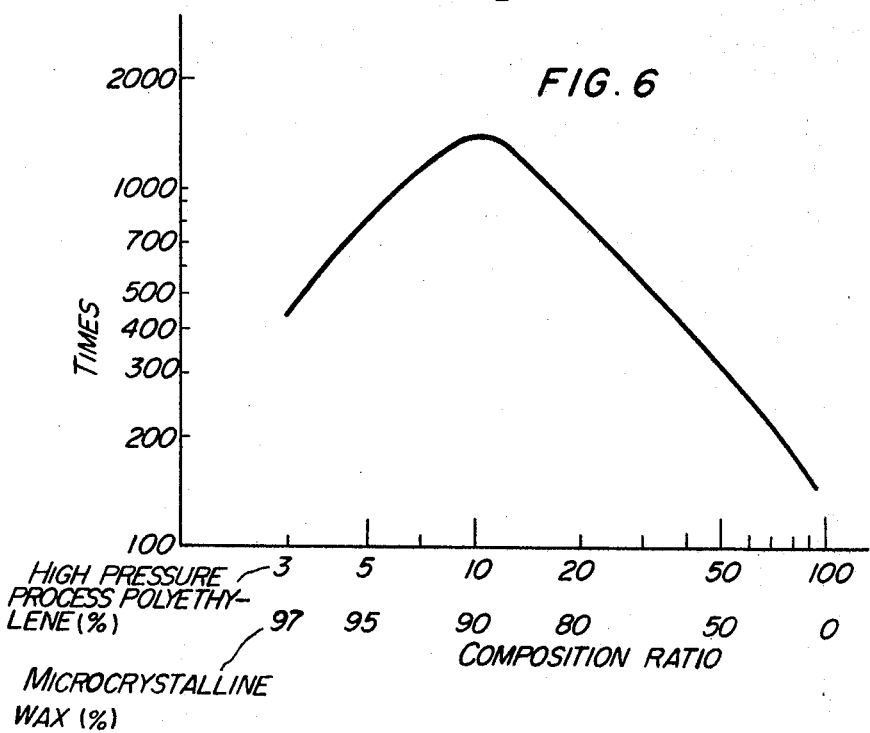
Figure 8:
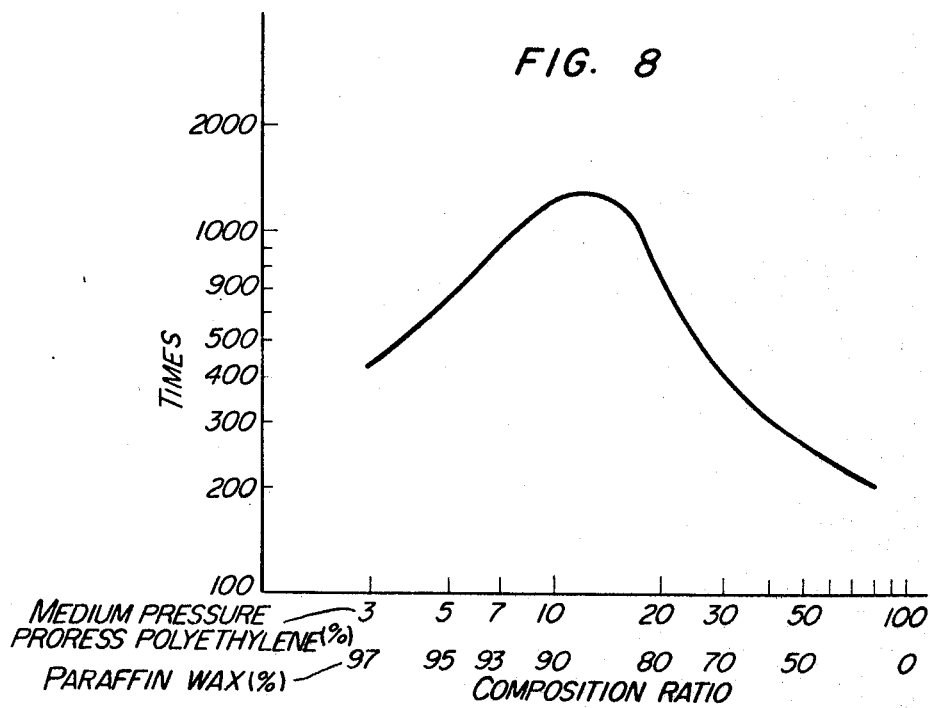
Figure 7:
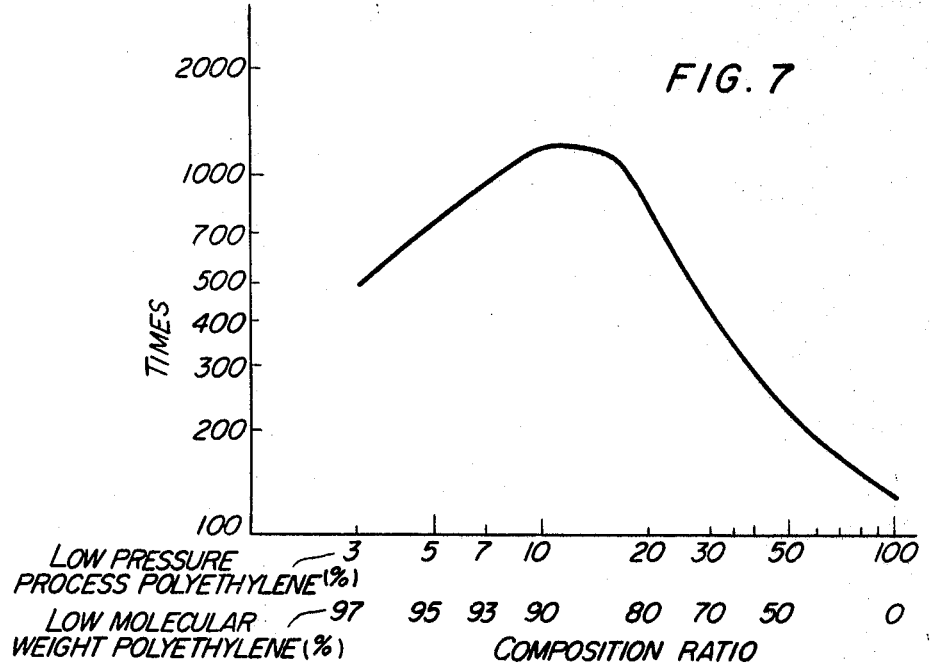

Further, in the present invention, amount of polyethylene is restricted to 5 to 20% with respect to the specific paraffin as stated above. The reason therefore is based on a result of study as shown in FIGS. 6, 7 and 8, wherein various compositions are studied in case 15% by weight of one of mixtures in various proportions consisting of low pressure process polyethylene, medium pressure process polyethylene or high pressure process polyethylene, each having a mean molecular weight of 70,000, and paraffin having a mean molecular weight of 1500 specified in the present invention is mixed with isotactic polypropylene.

From that result, it is found preferable that the proportion of polyethylene to specific paraffin is 5 to 20%.

In the present invention, the measurement of abrasion resistance (abrasion times above mentioned) was carried out according to a following procedure; multi-filaments, produced from a composition consisting of polypropylene and abrasion resistant, are afforded twists of 500 turns/meter, made into twines, rubbed with a grinder and numbered abrasion times until the filaments are broken. Various kinds of dyeability modifier can be used in the present invention, but the representative is as follows. (1) At least one kind of copolymer, one constituent of which is a radically polymerizable pyridine compound with or without a dyeing assistant.

Such copolymers can be produced by bulk polymerization, solution polymerization, pearl polymerization, suspension polymerization, emulsion polymerization or the like. Above-mentioned dyeability modifiers are used simultaneously with other modifiers. These dyeability modifiers consist of radically polymerizable pyridine compound and radically polymerizable or copolymerizable aromatic compound.

Radically polymerizable pyridine compounds include nuclear substituted vinyl pyridines such as 2-vinyl pyridine, 3-vinyl pyridine, 4-methyl vinyl pyridine, 2-methyl-5-vinyl pyridine or the like, or nuclear substituted alkenyl pyridines such as isopropenyl pyridine. Radically polymerizable or copolymerizable aromatic compounds include styrene, α-methyl styrene, p-methylstyrene, p-methoxy styrene, p-chlorostyrene, isopropenyl benzene, vinyl naphthalene and the like.

Dyeing assistants to be used simultaneously include polyoxyethylene - alkyl ethers, polyoxyethylene phenyl ethers, polyoxyethylene alkyl esters, polyoxyethylene aryl esters, polyoxydiethylene alkylamines, polyoxyalkylene glycols, polyoxypropylene alkylesters, polyoxypropylene aryl esters, polyoxypropylene alkylethers, polyoxypropylene phenylethers, randam or block copolymer of ethylene oxide and propylene oxide, polyethylene glycol, and polypropylene glycol. When the above-mentioned dyeing assistant is used in this invention, the amount generally is 0.1 to 10% by weight preferably 0.5 to 5% by weight based upon the weight of polypropylene.

(2) A metal salt or an anion exchange substance is used.

This kind of modifier may be used simultaneously with other modifiers or a dyeing assistant. Metal salts or anion exchange substance is an organic or inorganic salt of metal having a valency of more than 2 depending upon its purpose especially of Ni, Zn, Al and Sn. For example, oxides, hydroxides, complex salts, and fatty acid salts of Ni, Sn or Al are suitable. Among metal salts of fatty acids, those of fatty acid having relatively long chain or known as metal soaps having hydrocarbon radicals of long chain are preferable because of their greater affinity to polypropylene.

Dyeing assistants useful together with these metal containing salts or anion exchange substances include substances indicated above in (1).

Representative metal salts are shown hereinafter.
(a) Ni, Zn, Al or Sn salt of stearic acid,
(b) Basic Ni, Zn, Al or Sn salt of acetic acid,
(c) Ni, Zn, Al or Sn salt of naphthenic acid,
(d) A metal salt of a compound represented by a general formula of

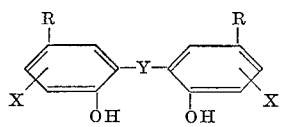

wherein R is a member selected from the group consisting of an alkyl radical having 1 to 30 carbon atoms, or a halogen atom, X is a member selected from the group consisting of a hydrogen atom, an alkyl radical having 1 to 20 carbon atoms, a halogen atom, a $NO_2$ or a CN radical, Y is a member selected from the group consisting of O, CO, S, SO, $SO_2$ and $CH_2$ and the metal is a member selected from the group consisting of Ba, Ca, Zn, Ti, Al, Sn, Cr, Co and Ni, (e) A compound represented by a general formula of

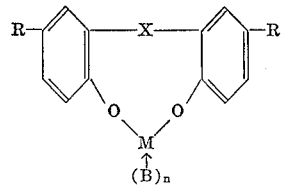

wherein X is a member selected from the group consisting of $SO_2$, $CH_2$, O, SO, CO and NR' in which R' is an alkyl radical having 1 to 4 carbons, M is a member selected from the group consisting of Co, Ni, Zn, Cd, or Pb, R is an alkyl radical having 4 to 18 carbons, B is a nitrogen containing aromatic compound selected from the group consisting of aliphatic monoamine, aliphatic diamine, aromatic monoamine, aromatic diamine, ammonia, pyridine, and quinoline and $n$ is an integer of 1 or 2.

(f) A compound represented by a general formula of $(RCOO)_m$—M—$(OR')_n$, wherein R is an alkyl radical having more than 12 carbon atoms, R' is an alkyl radical having at least one carbon atom, $m$ and $n$ are 0 or an integer of 1, 2 or 3; the sum of $m$ and $n$ is 2 or 3, and M is a metal atom selected from the group consisting of Mg, Zn, Cd, Al, and Ni.

(g) A compound represented by a general formula of (R—X—R'—COO—)$_n$M, wherein R is an alkyl radical having at least one preferably from 10 to 30 carbon atoms, R' is a member selected from the group consisting of an alkylene radical, an arylene radical and a cycloalkylene radical, X is a member selected from the group consisting of CoNH, OCO, $SO_2$, S or O, $n$ is an integer of 1 to 4, and M is a metal atom selected from the group consisting of Ba, Ca, Zn, Ti, Al, Sn, Cr, Co or Ni.

(h) A compound represented by a general formula of

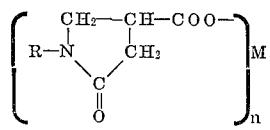

wherein R is a member selected from the group consisting of an alkyl radical having 1 to 30 carbon atoms, an aryl radical having 6 to 30 carbon atoms or an aralkyl radical, $n$ is an integer of 1 to 4 and M is a metal atom selected from the group consisting of Ba, Ca, Zn, Al, Ti, Sn, Cr, Co, or Ni.

(3) Other dyeability modifiers include polyester, polyamides, polystyrenes, polyvinyl pyridines, polyacryl esters, derivatives of higher fatty acid such as esters or amides.

At least one kind of metal compounds disclosed in from (a) to (h) is incorporated in polypropylene in an amount of 0.1 to 10% by weight to improve dyeability of the latter. If required, a dyeing assistant may be simultaneously used in this case.

In preparing, for example, polypropylene fibers with abrasion resistance from polypropylene composition with abrasion resistance, the relation of amount of added abrasion resistant, molecular weight of aimed fibers and denier of monofilaments to the properties of fibers must be considered to obtain the most suitable fibers depending upon whether they are used for apparels or industrial raw materials. In other words, the most suitable polypropylene fibers with abrasion resistance must be prepared by considering the specified relationships. The molecular weight of fibers in this invention means the intrinsic viscosity of polypropylene composing the fiber which is measured as $[\eta]$ of polypropylene at the temperature of 135° C. in the tetralin solvent, expressed as $[\eta]_f$.

Figure 3:
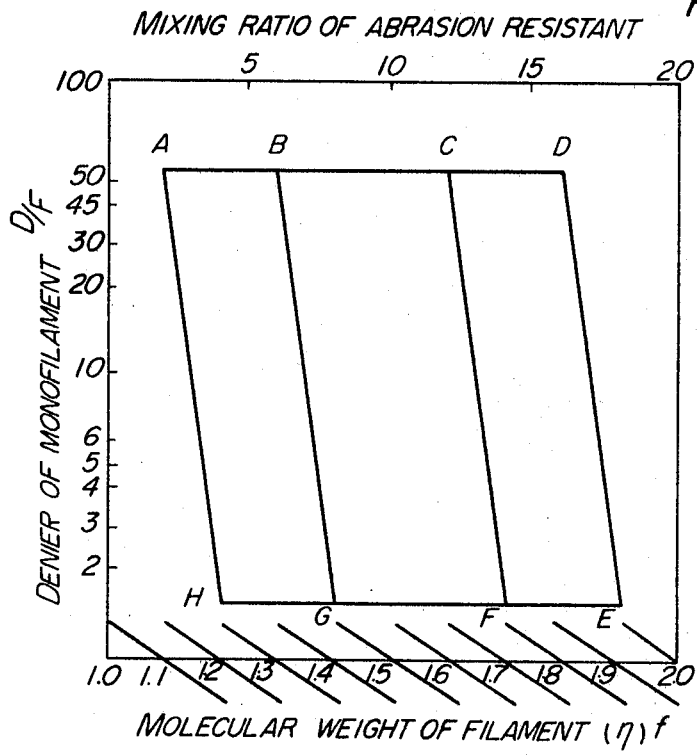

In preparing fibers by incorporating 1 to 20% by weight of abrasion resistant and subjecting the mixture to spinning and stretching, the relationships of added abrasion resistant, molecular weight of fibers and denier of monofilament are indicated in FIG. 3. By making the stretch 50 to 80% of the maximum stretch ratio when the above-mentioned relationship falls in the range enclosed by ACFH and by making the stretch 80 to 95% of the maximum stretch ratio when the above-mentioned relationship falls in the range enclosed by BDEG, it is possible to prepare polypropylene fibers having abrasion resistance most suitable to the above-mentioned uses. It is possible, in this case, to use dyeability modifier with or without dyeing assistant simultaneously.

In FIG. 3, the ordinate shows monofilament deniers of resulting multifilament $D/F$, the upper coordinate shows percent of abrasion resistant mixed to polypropylene and the lower coordinate shows molecular weight $[\eta]_f$ of fibers while indicating the range of $\pm 1$ at each points.

Stretching conditions utilized in the preparation of polypropylene fibers with abrasion resistance according to the present invention are selected depending upon the fiber properties required from the field of use. When fibers are used in the fields in which tenacity is required e.g. in the fields of industrial raw materials, the stretch ratio is, as indicated by BDEG in FIG. 3, preferably to be in the range of 80 to 95%, particularly of 85 to 95% of the maximum stretch ratio so as to be able to improve only abrasion resistance without causing the lowering of tenacity if the effects of molecular weight of fibers $[\eta]_f$ and denier of monofilament are also considered. When fibers are used in the field in which tenacity is not so much required e.g. in the fields of apparels, the stretch ratio is, as indicated by ACFH, preferably to be in the range containing fairly low stretch ratio such as in the range of 50 to 80%, particularly of 60 to 80% maximum stretch ratio of the effects of molecular weight of fibers $[\eta]_f$ and denier of monofilament are also considered.

As regards the relation of abrasion resistance of modified fibers to stretching condition, the greater the proportion of stretch ratio to maximum stretch ratio is, so much the abrasion resistance is lowered and the greater the extent of stretch is, so much greater is the extent of lowering. However this relation is dependent also upon the mixing ratio of abrasion resistant to polypropylene. When the proportion of mixing is greater, the lowering of abrasion resistance is not so great even when stretched in a great extent. If checked from the view point of mechanical properties, particularly tenacity, the greater the proportion of stretch ratio to maximum stretch ratio is, the greater is the tenacity and this relation is expressed approximately by the straight line.

As other independent factor for the improvement of abrasion resistance, the denier of monofilament of fibers must be considered. Since the abrasion phenomenon is dependent upon the surface area of fibers, the smaller the denier of monofilament is, so much less is the abrasion resistance when the fibers contain the same amount of abrasion resistant, and this relation is approximately expressed by the straight line on logarithmic scale. When the mixing ratio of abrasion resistant is increased in the monofilament of the same denier, the abrasion resistance can be increased until the mixing ratio reaches a certain saturation value, but the mixing ratio over this value is not only useless but it brings about deterioration of mechanical properties.

Now regarding the relation of molecular weight $[\eta]_f$ of polypropylene fibers to tenacity, in the case of unmodified polypropylene fibers, the increase of molecular weight $[\eta]_f$ tends to increase tenacity, but too much increase of molecular weight $[\eta]_f$ rather reduces tenacity at the ordinary condition of fiber manufacture. Whereas by incorporating an abrasion resistant modifier according to the present invention, it is even possible to prepare fibers having a still higher value of $[\eta]_f$ without causing the deterioration of tensile strength.

Just from the above-mentioned description, it may seem to be possible to obtain the fibers having properties sufficiently fulfilled the requirement even with polypropylene of high $[\eta]_f$ value prepared in the manufacturing condition suitable for the grade in which tenacity is not important. However, in reality, if molecular weight only is increased without increasing the mixing ratio of abrasion resistant, the stability in the step of stretching reduces and accordingly it is not desirable.

In short, by the combination of stretching condition with the range indicated in FIG. 3, it is possible to prepare fibers having suitable abrasion resistance in accordance with respective use.

The polypropylene structures, particularly fibers or tapes with abrasion resistance of the present invention produced from the polypropylene composition with abrasion resistance can be used, by itself, in various fields of application, but since the surface friction of these fibers or tapes is small, they may not be satisfactory, depending upon field of use. For example, when they are used in knotted state or the like, the fixing of knot is rather instable. Particularly when the polypropylene fibers or tapes with abrasion resistance are used in such industrial raw materials as fishing nets or ropes, fixing of knot of fishing nets, and the maintenance of solidity of ropes are not sufficient. Further when they are used in apparel fabrics, undesirable slip occurs.

These drawbacks in particular fields of use have been overcome by impregnating various kinds of resin into polypropylene fibers or tapes with abrasion resistance. In other words, resin-impregnated polypropylene fibers or tapes with abrasion resistance showing solid and firm fixing form of bundle can be obtained by impregnating a solution or an emulsion of a specified resin or a mixture of resins into polypropylene fibers or tapes with abrasion resistance and heating the impregnated fibers under tension. Further when these fibers or tapes are made into products and such products are not suitable to be treated uniformly and sufficiently by heat, i.e. very thick fabrics, ropes of large diameter, it is necessary to mix a substance having a large dielectric loss in a solution or an emulsion of a specified resin or a mixture of resins, and to heat the treated fabrics under stretching while applying high frequency heating.

Specified resins used in this case will be sufficient when they possess viscous, adhesive property. Resins which meet such requirements are illustrated hereinafter.

(1) Thermoplastic resins: polyvinyl chloride, polyvinylidene chloride, polyvinyl acetate, polyvinyl alcohol, polyvinyl acetal, polymethyl methacrylate, polyacrylate, polyesters, polyurethanes, polystyrene, polyethylene, polypropylene, cellulose derivatives.

(2) Thermosetting resins: urea resin, phenol resin, melamine resin, alkyd resin, xylene resin, unsaturated polyester resin, silicone resin, epoxy resin.

(3) Rubbery substances: butadiene type rubbers (particularly butadiene homopolymer, butadiene-styrene copolymer, and butadiene-acrylonitrile copolymer), isoprene type rubbers, polysulfide type rubbers (particularly polyalkylene sulfide), organic silicon compound type rubber (particularly alkyl siloxane condensate), fluorine compound type rubber (particularly trifluorochloroethylene-vinylidene fluoride copolymer), urethane rubbers (particularly polyester-isocyanate condensate), chlorosulfonated polyethylene, olefin type rubber (particularly isobutylene polymer), vinyl type rubber (particularly vinylchloride polymer, vinyl chloride-acetate copolymer and acrylic ester polymers).

(4) Natural resin and rubbery substance: rosin turpentine, shellac, cumaron, petroleum resin, natural rubber.

Each of the above-mentioned resins is used alone or as a mixture with other resins. It is used in the form of solution or emulsion. It is possible to add simultaneously a substance having a large dielectric loss, an inert filler, a friction increasing agent, a surfactant, a softener, an antistatic agent, a starching agent, a finishing agent, pigment, a dyestuff and/or other additives.

The polypropylene fibers or tapes with abrasion resistance thus treated with a specified resin can be applied widely in various uses.

Representative uses of these fibers or tapes and resins suitable for such uses are shown as follows.

(1) For fishing nets; polyolefins and their derivatives, cumarone resin, rosin and neoprene type rubber.

(2) For ropes; polyolefins and their derivatives, cumarone resin, rosin, neoprene type rubber, acrylic resin, melamine resin, vinylacetate resin, vinyl type rubber and a group of resins which are used with a polar substance by applying high frequency heating, such as epoxy resins, phenol resins or alkyd resin.

(3) Fabric for apparel with slip prevention; vinyl acetate resin, acetal resin, natural rubber, neoprene type rubber, polyolefin resins and their derivatives, cumarone resin and rosin.

As a friction increasing agent used in this invention, colloidal silica, xylene resin, polysulfide rubber, titanium dioxide or the like is useful.

Substances having a large dielectric loss, incorporating those used in the solution or emulsion of resins in this invention are those having large dielectric loss (dielectric constant×dielectric factor) i.e. substances having polarity in the constitution of molecule and accordingly showing much induction heat by high frequency heating. Such substances can be used regardless to whether they are organic substance or inorganic substance. Such substances include poly-valent alcohols such as ethylene glycol, glycerine and the like, and alkyl alcohol polymers such as polyethylene glycol, polypropylene glycol and the like. They can be used alone or as a mixture. They are also used in the form of aqueous solution or in the form of solid.

The amount of addition of a substance having a large dielectric loss varies according to its kind, the kind of resin used, the heat-set temperature and other properties required by treated products. Accordingly it must be decided after taking these points into consideration. In general the heating temperature is lower than 130° C.

It is particularly desirable to add a friction increasing agent before resin treatment when the polypropylene fibers or tapes with abrasion resistance of the present invention are used in the fields where fixation is necessary.

The resin treatment is particularly effective in the case of fibers or tapes with abrasion resistance of the present invention but it can also be used effectively in the case of unmodified polypropylene.

The following examples are given to illustrate the present invention without limiting its scope.

EXAMPLE 1

To the powder of crystalline polypropylene having $[\eta]=1.5$ when measured in Tetralin at a temperature of 135° C. and an isotactic index of 98%, low molecular weight polyethylene as paraffin having a mean molecular weight of 1400 and low pressure polyethylene having a mean molecular weight of 60,000 were admixed in such weight proportion (percent) as shown in Table 1 and the abrasion resistance of the shaped multifilaments were measured. The results of measurement are shown also in Table 1. In this table Nos. 1 and 2 are the comparative examples.

TABLE 1

| Experiment No. | Composition of shaped articles | | | Abrasion times |
|---|---|---|---|---|
| | Polypropylene (percent) | Paraffin (percent) | Polyethylene (percent) | |
| 1 | 100 | 0 | 0 | 150 |
| 2 | 95 | 5 | 0 | 300 |
| 3 | 95 | 4.7 | 0.3 | 800 |
| 4 | 95 | 4.3 | 0.7 | 800 |
| 5 | 95 | 4.0 | 1.0 | 600 |

EXAMPLE 2

Employing the same polypropylene, paraffin and polyethylene, and by the same testing method as in Example 1, the abrasion times of the shaped articles having such compositions as shown in Table 2 were measured. The results of measurement are also shown in Table 2.

TABLE 2

| Experiment No. | Composition of shaped articles | | | Abrasion times |
|---|---|---|---|---|
| | Polypropylene (percent) | Paraffin (percent) | Polyethylene (percent) | |
| 1 | 90 | 10 | 0 | 500 |
| 2 | 90 | 9 | 1.0 | 1,100 |
| 3 | 90 | 7 | 3.0 | 500 |
| 4 | 90 | 5 | 5 | 300 |
| 5 | 90 | 0 | 10 | 250 |

The usefulness of paraffin is apparent from this table.

EXAMPLE 3

Employing the same polypropylene, paraffin and polyethylene, and by the same testing method as in Example 1, the abrasion times of the shaped articles having such compositions as shown in Table 3 were measured. The results of measurement are also shown in Table 3. In this table Experiment No. 6 is a comparative example.

TABLE 3

| Experiment No. | Composition of shaped article | | | Abrasion times | Tenacity of twine (g./d.) |
|---|---|---|---|---|---|
| | Polypropylene percent | Paraffin percent | Polyethylene percent | | |
| 1 | 95 | 4.5 | 0.5 | 800 | 7.2 |
| 2 | 90 | 9 | 1.0 | 1,100 | 7.0 |
| 3 | 85 | 13.5 | 1.5 | 1,100 | 6.6 |
| 4 | 80 | 18 | 2.0 | 1,000 | 6.1 |
| 5 | 75 | 22.5 | 2.5 | 900 | 5.2 |
| 6 | 70 | 27.0 | 3.0 | 800 | 4.3 |

As is clear from Table 3, tenacity becomes lower when the composition of polypropylene included in the shaped article is lower than 75%.

EXAMPLE 4

To crystalline polypropylene having an intrinsic viscosity [η] of 1.5, isotactic index of 98%, microcrystalline wax having a mean molecular weight of 1,000 as paraffin and low pressure process polyethylene having a mean molecular weight of 80,000, together with a copolymer of vinyl pyridine and styrene or further as a dyeing assistant polyethylene glycol were added in proportions as shown in Table 4 and the abrasion resistance, dyeability and fastness of dyeing of shaped articles were measured by the same testing method as in Example 1. The results of measurement are shown in Tables 4 and 5. The composition of copolymer used as a dyeability modifier consisted of 70 parts of 2-methyl-5-vinyl pyridine and 30 parts of styrene.

TABLE 4

| Experiment No. | Polypropylene percent | Paraffin percent | Polyethylene percent | 2-methyl-5-vinyl pyridine-styrene copolymer percent | Polyethylene glycol percent | Abrasion times |
|---|---|---|---|---|---|---|
| 1 | 91.7 | 5.0 | 0.3 | 3 | 0 | 120 |
| 2 | 91 | 5.0 | 0.5 | 3 | 0.5 | 880 |
| 3 | 89 | 6.0 | 0.5 | 4 | 0.5 | 850 |
| 4 | 86.5 | 7.0 | 1.0 | 5 | 0.5 | 610 |
| 5 | 80 | 15.0 | 1.5 | 3 | 0.5 | 610 |

Fibers possessing properties shown in Table 4 were stretched and the resulting stretched yarns were made into fabrics. Employing an acid dyestuff, Fenazo Scarlett B, under the condition of 5% O.W.F., making acid concentration of dye bath 2 g./l. sulfuric acid, and both ratio as 50, at the temperature of 98° C., for 90 minutes, dyeing of the fabrics was carried out, and dye absorption (percent), fastness of dyed fabrics were measured. The results of measurements are shown in Table 5.

TABLE 5

| Experiment No. | Properties of fibers | | Dyeing properties | | | |
|---|---|---|---|---|---|---|
| | Tenacity (g./d.) | Elongation percent | Dye adsorption percent | Fastness | | |
| | | | | Washing | Dry cleaning | Crocking |
| 1 | 5.5 | 42 | 74 | 4 | 3 | 4–5 |
| 2 | 5.6 | 39 | 79 | 5 | 5 | 4–5 |
| 3 | 5.4 | 41 | 83 | 5 | 4 | 5 |
| 4 | 5.3 | 36 | 84 | 5 | 3–4 | 5 |
| 5 | 5.4 | 38 | 88 | 5 | 4 | 5 |

In this table the fastness to washing and to dry cleaning were measured according to JIS–L–1045–1959 beaker method BC–2 and SDC method respectively. The fastness to crocking was measured according to JIS–K–4009–1956.

EXAMPLE 5

To the same crystalline polypropylene as in Example 4, paraffin, polyethylene, together with as metal compounds, Nickel salts of compounds shown in Table 6 with or without as a dyeing improver polypropylene glycol were added and shaped articles having compositions shown in Table 6 were made. The results of abrasion resistance and dyeability of resultant shaped articles measured by the same method as in Example 4 are shown in Tables 6 and 7.

TABLE 6

| Experiment No. | Polypropylene (percent) | Paraffin (percent) | Polyethylene (percent) | Metal compound (percent) | Polypropylene glycol (percent) | Abrasion times |
|---|---|---|---|---|---|---|
| 1 | 92 | 7 | 1 | [I] 1.5 | 1 | 650 |
| 2 | 92 | 7 | 1 | [I] 1.5 | | 650 |
| 3 | 92 | 7 | 1 | [II] 1.5 | | 650 |
| 4 | 92 | 7 | 1 | [III] 1.5 | | 730 |
| 5 | 100 | | | [II] 1.5 | | 105 |

In Table 6 [I] is nickel stearate and [II] is a compound having a general formula of

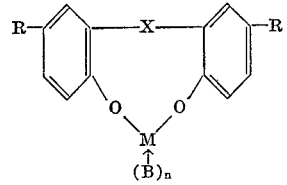

wherein X is $SO_2$, M is Ni, R is tertiary octyl, B is $H_2O$ and $n$ is 1. [III] is same as [II] but B is laurylamine.

TABLE 7

| Experiment No. | Properties of fibers | | Dyeing properties | | | |
|---|---|---|---|---|---|---|
| | Tenacity (g./d.) | Elongation (percent) | Dye adsorption percent | Fastness | | |
| | | | | Washing | Dry cleaning | Crocking |
| 1 | 7.3 | 25 | 92 | 5 | 5 | 5 |
| 2 | 7.3 | 25 | 86 | 5 | 5 | 5 |
| 3 | 7.0 | 29 | 87 | 5 | 5 | 5 |
| 4 | 7.5 | 26 | 85 | 5 | 5 | 5 |
| 5 | 7.6 | 24 | 81 | 5 | 5 | 5 |

Dyeing conditions in Table 7 were as follows:

Metal chelating type dyestuff: "National Polypropylene Dark Blue 2BM" (Allied chemical)
Dyeing condition: 5% O.W.F.
Dispersing agent: Mypo D (Nippon Yushi)
Acid: Glacial acetic acid 0.2 g./l.
Bath ratio: 1:50
Temperature: 98° C.
Time: 90 minutes
After dyeing, soaping was carried out.

EXAMPLE 6

In order to obtain fibers having various value of $[\eta]_f$ as shown in Table 8, various kinds of abrasion resistant were admixed to polypropylene having an isotactic index of 98% and molecular weight in terms of $[\eta]$ of 1.8 with various mixing ratio and subjected to melt spinning thereby to obtain unstretched yarns. The abrasion resistances of stretched yarns obtained from the above-mentioned unstretched yarns with stretch ratios included in the range specified in this invention as shown in FIG. 3 and with stretch ratios excluded out of that range are shown in FIG. 3. (Stretch ratio here is percent of stretching to maximum stretch ratio.) In these experiments, Nos. 1 to 4 are examples in which no particular tenacity is required and Nos. 5 to 9 are examples in which tenacity is required. Samples other than "a" are the case in which stretch ratios are outside of the range shown in FIG. 3.

anhydrous silicic acid, and heated and dried under tension at a temperature thereby to cover the surface of polypropylene fiber. Using resulting resin coated polypropylene fibers, fishing net yarns composed of 170d, S20/5, S410/3, Z210 were made and then trawler knotted nets were made therefrom. For comparison's sake, using polypropylene stretched yarns which were prepared under the same condition but were not treated by resin, trawler knotted nets were made. The results of comparison of knot securement as resistance to slipping and abrasion resistance are shown in Table 9.

TABLE 9

| Experiment No. | Specimens | Knot-securement Resistance to slipping (kg.) | Breaking strength of knot (kg.) | Abrasion resistance |
|---|---|---|---|---|
| 1 | Using resin treated filaments. | 8.6 | 12.2 | Good. |
| 2 | Net using non-treated filaments. | 4.5 | 13.3 | Do. |

As apparent from Table 9, the knot securement of nets materials is superior when the latter used filaments which had been impregnated with resin. Experiment No. 2 is a comparative example.

EXAMPLE 8

A mixture prepared by adding 10% by weight of low pressure polyethylene to microcrystalline wax as paraffin

TABLE 8

| No. | Sample, D/F | $[\eta]$- | Abrasion resistant modifiers (percent) | Stretch ratio (percent) | Dry tenacity (g./d.) | Dry elongation (percent) | Knot tenacity (g./d.) | Abrasion times |
|---|---|---|---|---|---|---|---|---|
| I | a 25 | 1.20 | 4.0 | 70 | 5.8 | 30.5 | 5.0 | 1,100 |
|   | b 25 | 1.20 | 4.0 | 90 | 7.8 | 18.5 | 5.8 | 500 |
|   | c 25 | 1.20 | 4.0 | 40 | 3.8 | 92.0 | 3.6 | 650 |
| II | a 4 | 1.30 | 6.0 | 70 | 6.1 | 31.2 | 5.2 | 1,200 |
|   | b 4 | 1.30 | 6.0 | 90 | 8.0 | 17.0 | 5.8 | 350 |
|   | c 4 | 1.30 | 6.0 | 40 | 4.0 | 80.0 | 4.0 | 650 |
| III | a 25 | 1.45 | 9.0 | 70 | 6.0 | 25.5 | 5.2 | 1,200 |
|   | b 25 | 1.45 | 9.0 | 40 | 3.6 | 78.0 | 3.5 | 650 |
| IV | a 4 | 1.55 | 11.0 | 70 | 6.5 | 26.4 | 5.3 | 1,300 |
|   | b 4 | 1.55 | 11.0 | 40 | 4.0 | 72.0 | 4.0 | 650 |
| V | a 25 | 1.45 | 9.0 | 90 | 8.3 | 21.3 | 6.1 | 1,200 |
|   | b 25 | 1.45 | 9.0 | 40 | 3.6 | 78.0 | 3.5 | 650 |
| VI | a 4 | 1.55 | 11.0 | 90 | 8.5 | 22.5 | 6.3 | 200 |
|   | b 4 | 1.55 | 11.0 | 40 | 4.0 | 72.0 | 4.0 | 650 |
| VII | a 25 | 1.70 | 14.0 | 90 | 9.4 | 18.3 | 6.0 | 1,100 |
|   | b 25 | 1.70 | 14.0 | 70 | 7.0 | 25.2 | 5.3 | 900 |
| VIII | a 4 | 1.80 | 16.0 | 90 | 9.6 | 17.5 | 6.0 | 1,100 |
|   | b 4 | 1.80 | 16.0 | 70 | 6.5 | 22.0 | 5.4 | 1,000 |

In Table 8 the abrasion resistant were microcrystalline wax as paraffin having a mean molecular weight of 1400 admixed with 10% by weight of low pressure process polyethylene having a mean molecular weight of 60,000.

EXAMPLE 7

A mixture was prepared by adding 20% by weight of (vs. paraffin) low pressure polyethylene to low molecular weight polyethylene as paraffin having a mean molecular weight of about 1000 and 10% by weight (vs. polypropylene) of this mixture was added to polypropylene. Unstretched yarns obtained by spinning resultant polypropylene composition were stretched with a stretch ratio of 90% of maximum stretch ratio to produce stretched yarns having 175 denier and 20 filaments. These stretched yarns were immersed for 2 minutes in an emulsion which is prepared by dissolving 30 parts by weight of cumarone resin in 10 parts by weight of xylene and adding thereto 60 parts by weight of water containing 3 parts of oleic acid-monoethanol amine and further adding a suitable amount of friction increasing agent mainly consisting of having a mean molecular weight of about 1,500, was incorporated into polypropylene having an isotactic index of 97% and molecular weight in terms of $[\eta]$ of 1.5 in a proportion of 15% by weight (vs. polypropylene). Unstretched yarns obtained by spinning of this mixture were stretched with a stretch ratio of 90% of maximum stretch ratio produce stretched yarns having 700d/120f. These stretched yarns were immersed for 2 minutes in an emulsion which is prepared by mixing 4 parts by weight of glycerine, 4 parts by weight of vinyl acetate resin and 2 parts by weight of water. Subsequently by use of high frequency heating (frequency 13.4 m.c., anode output 3.5 kv.) they are subjected to high frequency heat setting under tension. Using resin-coated polypropylene yarns, ropes having yarn construction of 700d x 3 x 12 x (3+9+6) x 3 were made. For comparison's sake, using polypropylene yarns which were not subjected to resin coating processing, ropes having the same yarn construction were made. The results of comparison carried out on maintenance of solidity, breaking strength, breaking elongation, etc. between two kinds of ropes, are shown in Table 10.

TABLE 10

| Experiment No. | Kinds of rope | Breaking strength at dry state | Breaking elongation at dry state | Maintenance of solidity | Diameter of rope after set (m./m.) |
|---|---|---|---|---|---|
| 1 | Ropes made of resin coated yarns | 9,000 | 48.0 | Good | 27.1 |
| 2 | Ropes made of non-treated yarns | 8,200 | 52.0 | No good | 28.6 |

The maintenance of solidity in Table 10 was measured by the state of bending by the cantilever method. Experiment No. 2 is a comparative example.

As is apparent from Table 10, ropes constructed with yarns produced by the present method are superior in the maintenance of solidity as ropes.

EXAMPLE 9

Crystalline polypropylene having $[\eta]$ of 1.6 determined in Tetralin at 135° C. and various isotactic index (called II in Table 1) was mixed with paraffin wax having a mean molecular weight of 1500 as paraffin and low pressure process polyethylene having a mean molecular weight of 30,000, and the mixture was melt-extruded to form multifilaments. Then, the abrasion resistance and strength of the thus obtained multifilaments were measured. The result is given in Table 11.

TABLE 11

| No. | II of PP | Composition | | | Abrasion resistance | Twine strength |
| --- | --- | --- | --- | --- | --- | --- |
| | | PP | PE | Paraffin | | |
| 1 | 98 | 95 | 0.5 | 4.5 | 900 | 7.2 |
| 2 | 96 | 95 | 0.5 | 4.5 | 850 | 6.2 |
| 3 | 90 | 95 | 0.5 | 4.5 | 480 | 4.4 |
| 4 | 90 | 90 | 3 | 7 | 300 | 4.0 |
| 5 | 90 | 97 | 0.5 | 2.5 | 350 | 4.6 |

As is evident from Table 11, the multifilaments prepared from three compositions No. 3 to 5 where II is less than 95% have low strength and reduced abrasion resistance.

EXAMPLE 10

A mixture of microcrystalline wax having a mean molecular weight of 2500 as paraffin and high pressure process polyethylene having a mean molecular weight of 30,000 was mixed with crystalline polypropylene having $[\eta]$ of 2.0 determined in Tetralin at 135° C. in a mixing proportion given in Table 2, and multifilaments were prepared therefrom by melt-extrusion. Then, the abrasion resistance and strength of the thus obtained multifilament were determined. The results are given in Table 12. A mixing ratio of paraffin to polyethylene was 1:0.15.

TABLE 12

| No. | PP (percent) | Mixture of PP and paraffin (percent) | Abrasion resistance | Twine strength |
| --- | --- | --- | --- | --- |
| 1 | 97 | 3 | 650 | 7.0 |
| 2 | 93 | 7 | 800 | 7.2 |
| 3 | 90 | 10 | 1,100 | 7.0 |
| 4 | 80 | 20 | 1,050 | 6.3 |
| 5 | 70 | 30 | 700 | 4.9 |

As is evident from Table 12, the abrasion resistance was not so much improved where the mixing ratio of a mixture of microcrystalline paraffin and polyethylene to polypropylene was short as in No. 1 or excessive as in No. 5, and the strength was lowered in case such ratio is excessive as in No. 5.

EXAMPLE 11

10% of a mixture of medium pressure process polyethylene having a mean molecular weight of 80,000 and paraffin wax as paraffin shown in Table 3 was blended with crystalline polypropylene having an isotactic index of 98% and $[\eta]$ of 1.7 determined in Tetralin at 135° C., and a tape was prepared from the resulting mixture. Then, split fibers were prepared by allowing the running tape to come in contact with a pin-projected roller, and the properties of the split fibers were determined.

TABLE 13

| | Molecular weight of paraffin wax | Composition, percent | | | Abrasion resistance | Strength |
| --- | --- | --- | --- | --- | --- | --- |
| | | PP | PE | Paraffin | | |
| 1 | 1,800 | 90 | 1 | 9 | 1,100 | 6.9 |
| 2 | 400 | 90 | 1 | 9 | 600 | 5.0 |
| 3 | 400 | 90 | 2 | 8 | 500 | 4.8 |
| 4 | 400 | 90 | 0.5 | 9.5 | 650 | 4.2 |

As is evident from Table 13, the abrasion resistance could not be sufficiently enhanced even by changing the composition ratio of polyethylene, when paraffin having mean molecular weight of 400 was used therein.

EXAMPLE 12

A mixture of low pressure process polyethylene and low molecular weight polyethylene having a mean molecular weight of 2,000 as paraffin was mixed with polypropylene having an isotactic index of 96% and $[\eta]_f$ of 2.5 determined in Tetralin in proportions as given in Table 14, and the results are given in Table 14.

TABLE 14

| No. | Composition | | | Abrasion resistance | Strength |
| --- | --- | --- | --- | --- | --- |
| | PP | PE | Paraffin | | |
| 1 | 100 | 0 | 0 | 150 | 7.5 |
| 2 | 95 | 0 | 5 | 300 | 7.2 |
| 3 | 95 | 0.3 | 4.7 | 800 | 7.2 |
| 4 | 95 | 0.7 | 4.3 | 1,200 | 7.1 |
| 5 | 95 | 1.0 | 4.0 | 950 | 6.8 |

As is evident from the above, the present invention is effective even for the tape. Nos. 1 and 2 are only for comparison.

We claim:

1. Polypropylene composition with an abrasive resistance, comprising polypropylene having an isotactic index of not less than 95%, and a molecular weight in terms of an intrinsic viscosity of 1.0 to 3.0 determined in Tetralin at 135° C., and 1 to 20% by weight, on the basis polypropylene, of a mixture consisting essentially of (A) paraffin wax, microcrystalline wax, or low molecular weight polyethylene as paraffin, each having a mean molecular weight of 500 to 3,000 and (B) 5 to 20% by weight, on the basis of paraffin, of polyethylene having a molecular weight of 12,000 to 120,000.

2. Polypropylene composition according to claim 1, wherein the molecular weight of (A) is 580 to 3000.

3. Polypropylene composition acocrding to claim 1, wherein the molecular weight of (A) is 1,000 to 2,000 and the proportion of (B) to (A) is 5 to 15%.

4. Polypropylene composition according to claim 1, wherein (A) is a low molecular weight polyethylene.

References Cited

UNITED STATES PATENTS 3,201,364    8/1965    Salyer.
3,322,708    5/1967    Wilson            260—28.5
3,340,123    9/1967    Osmon.

MORRIS LIEBMAN, Primary Examiner

S. L. FOX, Assistant Examiner

U.S. Cl. X.R.

260—897

UNITED STATES PATENT OFFICE
CERTIFICATE OF CORRECTION

Patent No. 3,522,198          Dated July 28, 1970

Inventor(s)  Nobuo Yamada, et al

It is certified that error appears in the above-identified patent and that said Letters Patent are hereby corrected as shown below:

In the heading to the printed specification, line 10, "Oct. 22, 1963" should read -- Oct. 23, 1963 --.

Signed and sealed this 10th day of October 1972.

(SEAL)
Attest:

EDWARD M. FLETCHER, JR.          ROBERT GOTTSCHALK
Attesting Officer                Commissioner of Patents